US010606336B2

(12) United States Patent
de la Cropte de Chanterac et al.

(10) Patent No.: US 10,606,336 B2
(45) Date of Patent: Mar. 31, 2020

(54) ELECTRONIC DEVICE WITH IMPROVED POWER MANAGEMENT

(71) Applicant: Apple Inc., Cupertino, CA (US)

(72) Inventors: Cyril de la Cropte de Chanterac, San Francisco, CA (US); Kartik R. Venkatraman, Santa Clara, CA (US); Alessandro Pelosi, San Jose, CA (US); Shardul S. Mangade, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 15/699,876

(22) Filed: Sep. 8, 2017

(65) Prior Publication Data

US 2018/0364786 A1 Dec. 20, 2018

Related U.S. Application Data

(60) Provisional application No. 62/520,917, filed on Jun. 16, 2017.

(51) Int. Cl.
*H02J 7/00* (2006.01)
*G06F 1/329* (2019.01)
*H04W 52/02* (2009.01)
*G06F 1/20* (2006.01)
*G06F 1/3212* (2019.01)
*G06F 1/324* (2019.01)

(52) U.S. Cl.
CPC .............. *G06F 1/329* (2013.01); *G06F 1/206* (2013.01); *G06F 1/324* (2013.01); *G06F 1/3212* (2013.01); *H04W 52/0258* (2013.01); *H01M 2220/30* (2013.01)

(58) Field of Classification Search
CPC ........ G06F 1/329; G06F 1/206; G06F 1/3212; G06F 1/324; H04W 52/0258
USPC ......................................................... 320/114
See application file for complete search history.

(56) References Cited

U.S. PATENT DOCUMENTS 5,606,242 A * 2/1997 Hull ...................... H02J 7/0004
320/106
9,438,058 B2 * 9/2016 Degura ................. H02J 7/0068
9,748,787 B2 8/2017 Thompson et al.
2005/0156577 A1 * 7/2005 Sully ................. H01M 10/0525
320/160

(Continued)

*Primary Examiner* — Yalkew Fantu
(74) *Attorney, Agent, or Firm* — Treyz Law Group, P.C.; Joseph F. Guihan

(57) ABSTRACT

An electronic device may have a power system with a battery. The power system receives power such as wireless power or wired power and uses a portion of the received power to charge the battery as needed. Control circuitry in the portable electronic device is used to run background processes such as image processing tasks, data synchronization tasks, indexing, and other background processes. In some circumstances, such as when the battery is below a certain state of charge threshold, background processes may be stopped so that the battery is charged as fast as possible. Once above this initial state of charge threshold, background processes may be performed during charging as long as the temperature and state of charge of the battery do not exceed safety temperature and safety state of charge values. Performing background processes in these conditions ensures requisite background processing tasks are completed while preserving battery health.

20 Claims, 12 Drawing Sheets

(56) References Cited

U.S. PATENT DOCUMENTS

| | | |
|---|---|---|
| 2011/0175569 A1 | 7/2011 | Austin |
| 2012/0025786 A1* | 2/2012 | Heizer .................. H02J 7/0077 |
| | | 320/160 |
| 2015/0123595 A1* | 5/2015 | Hussain ................ H02J 7/0052 |
| | | 320/107 |
| 2016/0064961 A1 | 3/2016 | DiCarlo et al. |

* cited by examiner

ELECTRONIC DEVICE WITH IMPROVED POWER MANAGEMENT

This application claims the benefit of provisional patent application No. 62/520,917, filed on Jun. 16, 2017, which is hereby incorporated by reference herein in its entirety.

BACKGROUND

This relates generally to electronic devices, and, more particularly, to power management in electronic devices.

Electronic devices such as cellular telephones have batteries. During operation, the electronic device may receive power (i.e., wired or wireless power) from chargers. The received power may be distributed to internal circuitry in the electronic device and/or to the battery of the electronic device. When the electronic device is not receiving power from a charger, the battery of the electronic device may provide power for internal circuitry in the electronic device.

If care is not taken, the battery may be damaged or aging of the battery may be accelerated during charging.

SUMMARY

An electronic device such as a portable electronic device may have a power system with a battery. The power system receives power such as wireless power or wired power and uses a portion of the received power to charge the battery as needed.

Control circuitry in the portable electronic device is used to execute code. For example, software running on the control circuitry handles background processes such as image processing tasks, data synchronization tasks (e.g., downloading email), indexing, and other background processes. Power consumption by the control circuitry can be adjusted by deactivating or activating processor cores in the control circuitry, by adjusting other hardware settings, and/or by selectively starting or stopping software activities.

In some circumstances, such as when the battery is below a certain state of charge threshold, background processes are stopped so that the battery is charged as fast as possible. Once above this initial state of charge threshold, background processes may be performed during charging as long as the temperature and state of charge of the battery do not exceed safety temperature and safety state of charge values. Performing background processes in these conditions has the benefit of accomplishing the requisite background processing tasks while preserving battery health.

DETAILED DESCRIPTION

Figure 1:
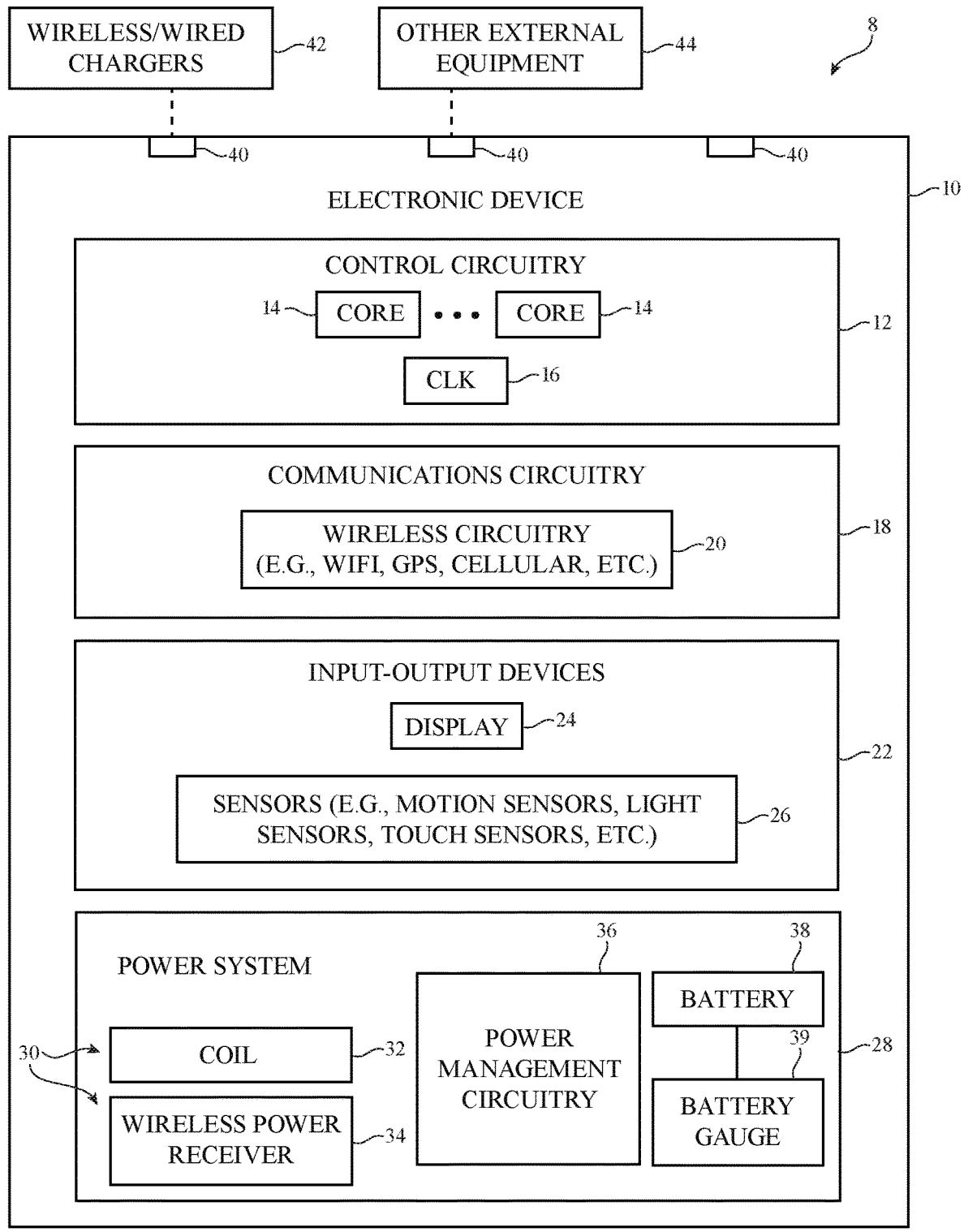
FIG. 1 is a schematic diagram of an illustrative system including an electronic device with a rechargeable battery in accordance with an embodiment.

An illustrative system that includes an electronic device with a rechargeable battery is shown in FIG. 1. As shown in FIG. 1, system 8 includes electronic devices such as electronic device 10. Electronic device 10 has battery 38. Electronic device 10 may be a cellular telephone, a computer (e.g., a tablet computer or laptop computer), a wristwatch device or other wearable equipment, and so forth. Illustrative configurations in which electronic device 10 is a portable electronic device may sometimes be described herein as an example.

As shown in FIG. 1, exemplary electronic device 10 has control circuitry 12. Control circuitry 12 may include storage and processing circuitry such as processing circuitry associated with microprocessors, power management units, baseband processors, digital signal processors, microcontrollers, and/or application-specific integrated circuits with processing circuits. Control circuitry 12 implements desired control and communications features in device 10. For example, control circuitry 12 may be used in determining power transmission levels, processing sensor data, processing user input, and processing other information and in using this information to adjust the operation of device 10 (e.g., to adjust parameters influencing battery charging). Control circuitry 12 may be configured to perform these operations using hardware (e.g., dedicated hardware or circuitry), firmware, and/or software (e.g., code that runs on the hardware of device 10). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 12. The processing circuitry may include application-specific integrated circuits with processing circuitry, one or more microprocessors, or other processing circuitry.

The processing circuitry of control circuitry 12 may have adjustable hardware resources. For example, control circuitry 12 may include multiple processing cores 14 that can be selectively switched into or out of use. Control circuitry 12 may also have clock circuitry such as clock circuitry 16. Clock circuitry 16 may supply an adjustable processor clock (e.g., a processor clock with a frequency that can be adjusted between a low frequency f1 to conserve power and a high frequency f2 to enhance processing speed). Clock circuitry 16 may also maintain information on the current time of day and date for device 10.

Device 10 has communications circuitry 18. Communications circuitry 18 may include wired communications circuitry (e.g., circuitry for transmitting and/or receiving digital and/or analog signals via a port associated with a connector 40) and may include wireless communications circuitry 20 (e.g., radio-frequency transceivers and antennas) for supporting communications with wireless equipment. Wireless communications circuitry 20 may include wireless local area network circuitry (e.g., WiFi® circuitry), cellular telephone transceiver circuitry, satellite positioning system receiver circuitry (e.g., a Global Positioning System receiver for determining location, velocity, etc.), near-field communications circuitry and/or other wireless communications circuitry.

Device 10 may use input-output devices 22 to receive input from a user and the operating environment of device 10 and to provide output. Input-output devices 22 may include one or more visual output devices such as display 24 (e.g., a liquid crystal display, an organic light-emitting diode display, or other display). Input-output devices 22 may also include buttons, joysticks, scrolling wheels, touch pads, key pads, keyboards, microphones, speakers, displays (e.g., touch screen displays), tone generators, vibrators (e.g., piezoelectric vibrating components, etc.), cameras, sensors, light-emitting diodes and other status indicators, data ports, etc. Sensors 26 in input-output devices 22 may include force sensors, touch sensors, capacitive proximity sensors, optical proximity sensors, ambient light sensors, temperature sensors, air pressure sensors, gas sensors, particulate sensors, magnetic sensors, motion and orientation sensors (e.g., inertial measurement units based on one or more sensors such as accelerometer, gyroscopes, and magnetometers), strain gauges, etc.

Electronic device 10 may interact with equipment such as charging system 42 (sometimes referred to as a charging mat, charging puck, power adapter, etc.). Electronic device 10 may also interact with other external equipment 44 (e.g., an accessory battery case, earphones, network equipment, etc.). Charging system 42 may include wired power circuitry and/or wireless power circuitry. For example, charging system 42 may include a wired power source that provides direct-current power to device 10 from a mains power supply (e.g., system 42 may include an alternating-current-to-direct current adapter, etc.). Direct-current power may also be supplied to device 10 from a battery case or other external equipment 44 plugged into a port associated with a connector such as one of connectors 40 in device 10 or other equipment for supplying power such as direct-current power over a cable or other wired link coupled to connector 40. If desired, charging system 42 may include wireless power transmitting circuitry for supplying wireless power to electronic device 10. Wireless power transmitting circuitry in system 42 may, for example, include an oscillator and inverter circuitry that drives a signal into a coil and thereby causes the coil to produce electromagnetic fields that are received by a corresponding coil in device 10 (see, e.g., coil 32 and associated wireless power receiver 34 in wireless power receiver circuitry 30). Configurations in which wireless power is transmitted using capacitive coupling arrangements, near-field wireless power transmissions, and/or other wireless power arrangements may also be used. The use of an inductive wireless power arrangement in which system 42 and device 10 support inductive power transfer is merely illustrative.

Using communications circuitry 18, device 10 can communicate with external equipment such as equipment 44. Equipment 44 may include accessories that can be communicatively coupled to device 10 (e.g., ear buds, covers, keyboards, mice, displays, etc.), may include wireless local area network equipment and/or other computing equipment that interacts with device 10, may include peer devices (e.g., other devices such as device 10), may include covers, cases, and other accessories with optional supplemental batteries, and/or may include other electronic equipment.

Device 10 may include power circuitry such as power system 28. Power system 28 may include a battery such as battery 38. Battery 38 of device 10 may be used to power device 10 when device 10 is not receiving wired or wireless power from another source. In some configurations, device 10 may use battery power associated with an accessory (e.g., external equipment 44). In other configurations, battery 38 of device 10 may be used to supply power to external equipment 44. System 42 may also power device 10 using wired or wireless power. Power system 28 may be used in receiving wired power from an external source (e.g., system 42 or a battery case) and/or may include wireless power receiving circuitry 30 for receiving wirelessly transmitted power from a corresponding wireless power transmitting circuit in system 42. Wireless power receiving circuitry 30 may, as an example, include a coil such as coil 32 and an associated wireless power receiver 34 (e.g., a rectifier). During operation, coil 32 may receive wirelessly transmitted power signals and wireless power receiver 34 and may convert these received signals into direct-current power for device 10.

Power management circuit 36 may be used in managing the power from wireless power receiver 34. Power management circuitry 36 may be formed as a part of the central processing unit (CPU) for device 10. Alternatively, power management circuitry 36 may be formed from one or more power management unit (PMU) integrated circuits (i.e., formed separately from the central processing unit). In either scenario, power management circuitry 36 may be considered control circuitry (i.e., part of control circuitry 12 in FIG. 1). During operation, power management circuitry 36 distributes received power to internal circuitry in device 10 and/or to battery 38 (e.g., to charge battery 38). Power management circuitry 36 also distributes power from battery 38 to internal circuitry in device 10 or to external equipment such as external equipment 44. Power management circuitry 36 may include a charger circuit configured to receive power from an external power source and to charge the battery using power received from the external power source. For example, the charger circuit may charge the battery using power received from an external power source by wireless power receiver 34. The charger circuit may be disconnected from the battery to stop charging the battery (even if power is still being received from an external power source). When the charger circuit is disconnected from the battery, the control circuitry may be powered by power from the external power source.

Battery gauge 39 in power system 28 obtains measurements from battery 38 in order to determine properties of the battery in real time. For example, battery gauge 39 may include a voltage sensor (sometimes referred to as a voltmeter) that is configured to measure a voltage associated with the battery, a current sensor (sometimes referred to as an ammeter) that is configured to measure a current associated with the battery, and a temperature sensor that is configured to measure a temperature associated with the battery. Battery gauge 39 may use these sensors to determine properties of the battery. For example, the voltage sensor may determine the voltage of the battery. The voltage of the battery may be used to help determine a state of charge (SOC) of the battery (i.e., an assessment of the battery charge level as a percentage). The current sensor may measure a load applied to the battery (i.e., current drawn to operate components in the electronic device). The temperature sensor may measure a temperature associated with the battery. One or more temperature sensors may be formed in the interior of the electronic device, in a thermally isolated region of the electronic device, on the exterior of the electronic device, or other desired locations. Temperature sensors on the exterior of the device may measure environmental conditions of the electronic device. Temperature sensors in the interior of the electronic device may measure the temperature of the battery itself. Multiple temperature sensors may be included to account for situations in which the temperature of the battery is non-uniform (i.e., the battery has temperature gradients or hotspots). It should also be noted that battery gauge 39 may be formed as a portion of power management circuitry 36 if desired.

The operation of power system 28 may be controlled based on the status of battery 38 (e.g., the current state of charge in battery 38), based on other information from battery gauge 39, based on nature and quantity of power available from external sources (e.g., a battery in an accessory case, wired or wireless power from a power source such as system 42, etc.), and based on other factors. For example, if battery 38 is depleted, charging of battery 38 may be prioritized over powering internal components in device 10. Battery charging can also be prioritized based on current and/or historical factors related to the user's usage of device 10, measured temperature information, whether device 10 is in motion or is stationary, based on position information (e.g., satellite navigation system data indicating where device 10 is currently located), information on the speed of device 10 relative to the Earth (e.g., whether or not device 10 is moving in a vehicle), information in a software program such as a calendar or other program, user settings, and/or other information.

In some situations, the amount of power received by device 10 from external source(s) such as system 42 will be limited to a maximum amount (e.g., an amount dictated by the capabilities of a wireless charging pad or other equipment that is being used to supply device 10 with power). A wireless charger may, for example, be capable of supplying device 10 with a maximum of 5 W of wireless power. The internal power circuitry in device 10 may also have a maximum capacity (e.g., a limit to avoid excess currents, etc.). As a result, the amount of power that can be received by power system 28 and distributed to: 1) internal circuitry in device 10 such as control circuitry 12, communications circuitry 18, and other non-battery-charging circuitry and 2) battery 38 is constrained. In some cases, power will be available in excess. However, excessive charging of battery 38 has the potential to damage the battery. Device 10 may therefore benefit from intelligently allocating power between internal circuitry and battery 38. This may help ensure that battery 38 is charged at appropriate times at a suitably rapid pace while maintaining battery health.

There are a number of considerations that may be taken account when allocating power between internal circuitry and battery 38. First, charging battery 38 as quickly as possible may be desirable from a user experience perspective. In general, users may want devices to charge as fast as possible. Therefore, the battery may be charged as fast as possible when receiving power from external sources. To charge the battery as fast as possible, non-critical software and/or hardware functions (such as background processes) can be deactivated, resulting in an increase in the amount of power available for charging battery 38.

Other considerations may need to be taken into account during charging. For example, electronic device 10 may need to perform housekeeping operations such as image processing operations for organizing photographs, for other indexing operations, and for on-line database synchronization services and other cloud services. These types of activities may generally be referred to as background processes. The background processes may not be critical to device functionality at any given point (meaning that they may be disabled to enable fast charging of the device battery if necessary). However, although not critical at any instant, there may be a quota of desired background processing that device 10 needs to perform in a given length of time. For example, it may be desirable for device 10 to perform 10 hours of background processing each week. Performing the background processing requires power consumption. To complete the quota of background processing, it may therefore be desirable to complete background processing while the device is being charged. However, performing background processing during charging will reduce the rate at which the battery is charged. It is therefore necessary to find a balance between completing background processes and charging the device battery at a suitably rapid pace.

Another consideration in determining power allocation in electronic device 10 is battery health. In some cases, charging the battery as quickly as possible may lead to accelerated aging in the battery. Take an example in which the electronic device is connected to a power source overnight (e.g., for 8 hours). If the battery is charged as quickly as possible, the battery may reach a state of charge of 100% in a relatively short amount of time (e.g., 3 hours). Once the battery is 100% charged, continuing to direct power into the battery may damage the battery. Therefore, for the remaining time (e.g., 5 hours), the battery may alternately be disconnected from the power source (and allowed to drain) and reconnected to the power source (until the battery reaches 100% charged). This technique may be referred to as a "sawtooth" technique or "sawtoothing." While an improvement over taking no action (and overcharging the battery), sawtoothing is still not optimal for preserving battery health and may accelerate aging of the battery. Therefore, actions may be taken to avoid or mitigate sawtoothing during charging.

The battery may be particularly susceptible to damage when certain conditions are present. For example, when the temperature and voltage of the battery are high, the battery may be vulnerable to damage (i.e., from plating). The battery may have a safety voltage or a safety state of charge and a safety temperature that define the safe ranges for the battery. If the battery has a voltage higher than the safety state of charge and a temperature higher than the safety temperature, then the battery may be susceptible to plating. When the battery is in a vulnerable state (i.e., with high state of charge and high temperature), it may be desirable to avoid a high load on the battery and/or further temperature increases.

All of the above considerations may be taken into account when determining how to distribute power through electronic device 10. In some circumstances, such as for a certain length of time after charging begins (i.e., 15 minutes) or when the battery is below a certain state of charge threshold (i.e., 20%), the battery may be charged as fast as possible. After this length of time (or above a certain state of charge threshold), background processes may be performed during charging. For example, background processes may be performed as long as the temperature and state of charge of the battery are sufficiently low. Performing background processes in these conditions has the benefit of accomplishing the requisite background processing tasks. An additional benefit to performing background processes in these conditions is that by performing the background processes (and therefore reducing the rate at which the battery is charged), the battery will reach a 100% charge level at a later time, thus reducing sawtoothing. Finally, performing the background processes only when the battery is in safe operating conditions will preserve battery health.

To summarize, in many circumstances available power to an electronic device is limited. As an example, wireless power transmission may be somewhat limited due to the wireless power delivery capabilities of system 42, due to suboptimal coupling between system 42 and device 10, and/or due to the presence of competing devices (e.g., other devices that are being simultaneously charged by system 42 and that are therefore competing for the wireless power being delivered by system 42). Particularly in power-limited circumstances, device 10 (e.g., control circuitry 12) analyzes current and historical operating conditions and other information to determine a satisfactory allocation between using power to power control circuitry 12 and other non-battery components (i.e., perform background processing) in device 10 and using power to charge battery 38. Once a desired allocation has been determined, control circuitry 12 can adjust the operation of device 10 so that non-battery components receive a first amount of power and so that battery 38 receives a second amount of power in an appropriate ratio (e.g., in an appropriate ratio between the first and second amounts). With one illustrative configuration, control circuitry 12 can make adjustments to the software that is running on device 10 and the hardware of device that either increase or decrease the amount of power consumed by the non-battery-charging circuitry of device 10.

Figure 2:
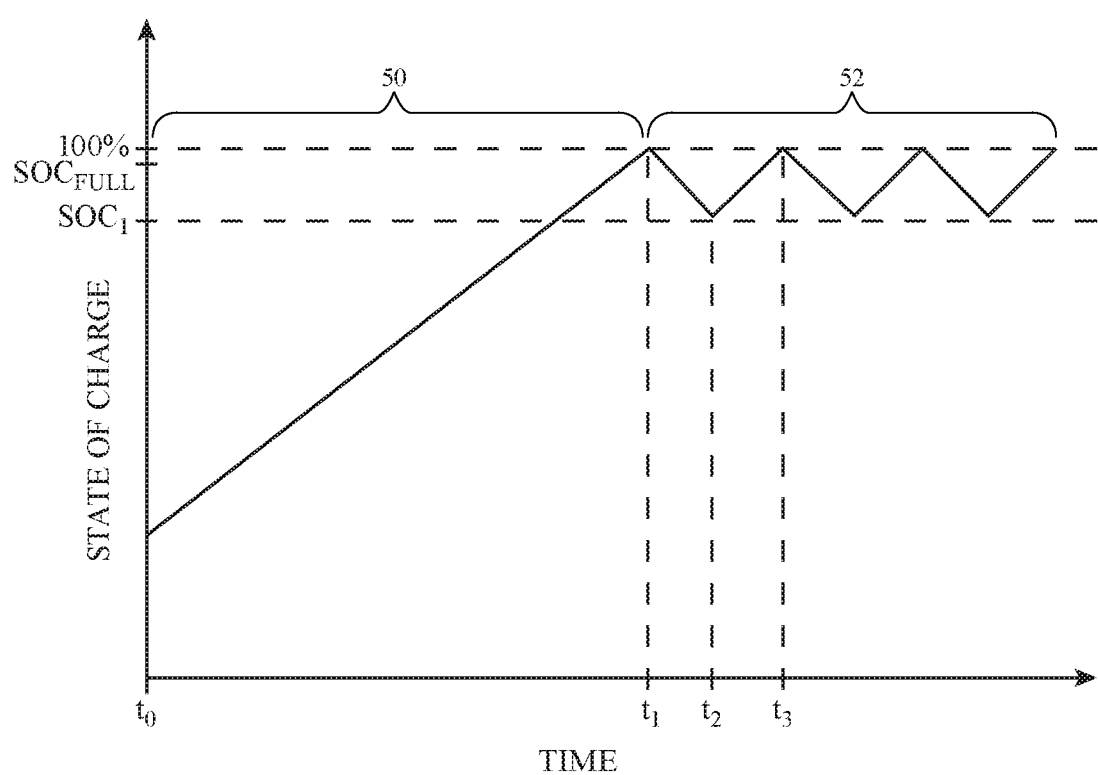
FIG. 2 is a graph showing the state of charge (SOC) over time of an illustrative battery that implements sawtoothing during charging in accordance with an embodiment.

FIG. 2 is a graph showing the state of charge (SOC) over time of an illustrative battery that implements sawtoothing during charging. As shown, between $t_0$ and $t_1$ (i.e., during time period 50), the battery may be charged at a given rate. At $t_1$, the state of charge may reach 100%. Then, to prevent damage to the battery, the battery may be disconnected from the power source and allowed to drain. The state of charge of the battery may decrease until the state of charge reaches a predetermined state of charge threshold (e.g., $SOC_1$) at $t_2$. Once the threshold is reached, the battery may be charged again between $t_2$ and $t_3$. When the state of charge again reaches 100%, the process may be repeated. This period of alternately dropping and increasing the state of charge of the battery (i.e., during time period 52) is referred to as sawtoothing. The period of time during which the state of charge drops from and returns to 100% (i.e., $t_1$ to $t_3$) may be referred to as a sawtooth cycle.

It should be understood that in practice, there may be a range in which the battery is considered fully charged (instead of a single finite value). For example, the battery may be considered fully charged if the state of charge exceeds 98% or 99% (e.g., $SOC_{FULL}$ in FIG. 2). The electronic device may sometimes display a battery indicator that shows the state of charge for the battery. For simplicity, the battery indicator may display '100%' any time the battery is in the 'fully charged' zone (e.g., between $SOC_{FULL}$ and 100%) even if in reality the state of charge may increase or decrease within the fully charged zone. Herein the battery may be referred to as fully charged or as having a state of charge of 100% when state of charge of the battery is within the fully charged zone.

The state of charge threshold used to determine the sawtooth profile (i.e., $SOC_1$ in FIG. 2) may be any desired state of charge. For example, the state of charge threshold may be 95%, 90%, between 92 and 98%, greater than 85%, less than 100%, or any other desired state of charge. The state of charge threshold may also vary. For example, the state of charge threshold may generally be kept at 95% and intermittently dropped to 90% to allow a deeper discharge during sawtooth period 52. Additionally, the battery may be disconnected from the power source and allowed to drain at any desired state of charge threshold (e.g., 99% or any other desired value for $SOC_{FULL}$ that defines the lower end of a fully charged or 100% charged range). The state of charge range in which sawtoothing occurs (e.g., $SOC_1$—100% in FIG. 2) may sometimes be referred to as battery health maintenance zone or battery health maintenance range.

Figure 3:
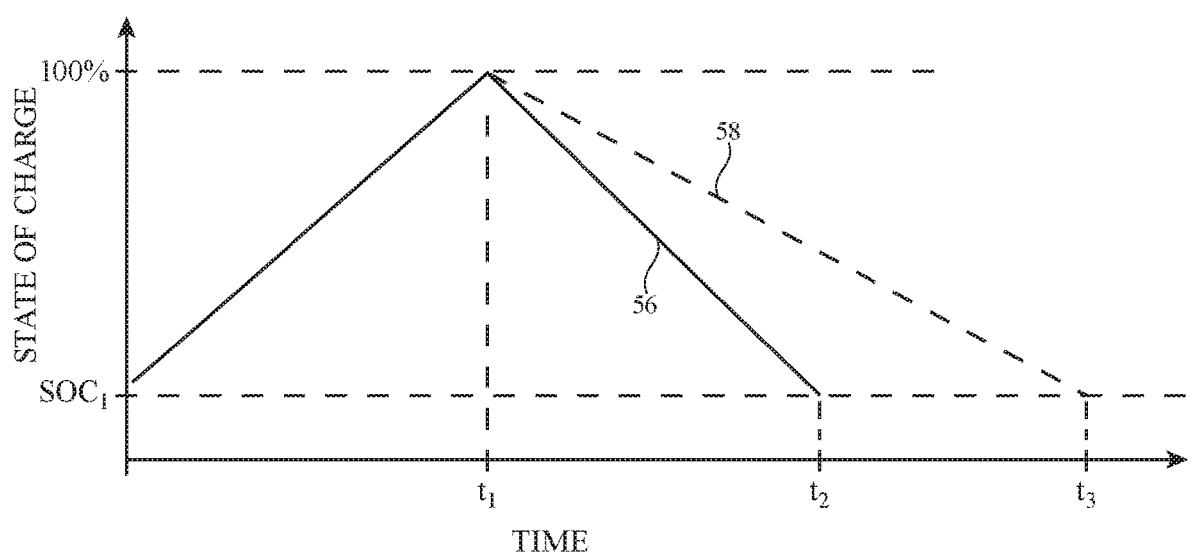
FIG. 3 is a graph of illustrative state of charge profiles for a battery during sawtoothing showing how actions may be taken to reduce the impact of sawtoothing on the battery in accordance with an embodiment.

FIG. 3 is a graph showing illustrative state of charge profiles for a battery during sawtoothing. FIG. 3 illustrates how actions may be taken to reduce the impact of sawtoothing on the battery. As shown, the state of charge of the battery may reach 100% at $t_1$. The battery may be disconnected from received power and, accordingly, the state of charge may drop (as described in connection with FIG. 2). If no other action is taken, the state of charge may follow profile 56. In this scenario, the state of charge may reach $SOC_1$ at $t_2$. In an alternate embodiment, however, the load applied to the battery may be reduced at $t_1$ and the state of charge may follow profile 58. The load applied to the battery may be reduced at $t_1$ by deactivating non-critical software and/or hardware functions. For example, background processing may be stopped at $t_1$. Due to the reduced load on battery 38, the state of charge drops at a slower rate. The state of charge therefore does not reach $SOC_1$ until $t_3$. The increased length of time between 100% and $SOC_1$ reduces the number of required sawtooth cycles. For example, if profile 56 is followed each sawtooth cycle may take 30 minutes, whereas if profile 58 is followed each sawtooth cycle may take 45 minutes. If the sawtoothing period lasted for 3 hours, the battery following profile 56 would require 6 sawtooth cycles whereas the battery following profile 58 would require only 4 sawtooth cycles. Reducing the number of sawtooth cycles in this way may be beneficial for preserving battery health. Note that the example above is merely illustrative and each sawtooth cycle may take any desired length of time.

Figure 4:
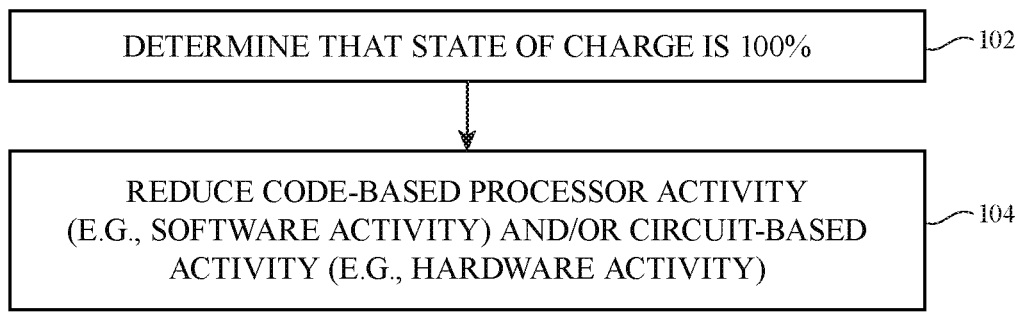
FIG. 4 is a flowchart showing illustrative method steps for preserving battery health by reducing sawtoothing in accordance with an embodiment.

FIG. 4 is a flowchart showing illustrative method steps for preserving battery health by reducing sawtoothing. As shown, at step 102 control circuitry (i.e., control circuitry 12) may determine that the state of charge of battery 38 is 100% (i.e., that the battery is in the fully charged zone). Accordingly, sawtoothing may begin in battery 38. However, to preserve battery health, the control circuitry may make adjustments at step 104 such as reducing code-based processor activity and/or circuit-based activity (e.g., stopping at least one background process).

Control circuitry 12 may reduce software activity by terminating, temporarily stopping, or partially curtailing the execution of code on processor 12 using a scheduling management subsystem or other resources on device 10. Control circuitry 12 may reduce hardware activity by halting code execution by one or more cores 14 in processor 12, by reducing the processor clock for control circuitry 12, and/or by selectively depowering power consuming components in device 10. When curtailing software activity, the activity that is curtailed can span one or more processes and/or may involve one or more tasks associated with those processes. Hardware throttling may involve reducing the number of cores 14 that are in use and/or other adjustments to the circuitry of device 10 that affect how much power is being consumed by device 10 (e.g., clock settings, processor options, hardware accelerator options, wireless communications settings and/or other communications circuit settings, display brightness settings, display refresh rate settings, display resolution settings, etc.).

In some embodiments, step 104 involves reducing software activity in device 10. For example, the amount of code-based processor activity (e.g., processor activity involved in executing computer code) is reduced by terminating software tasks/processes. The software that is terminated is, for example, associated with operating system functions. In one illustrative example, an operating system function is used to cluster photographs by performing scene and/or facial recognition on a library of images. This function may be processing intensive and may slow down device 10 by 25% or more when active. When it is desired to reduce the load on battery 38 at step 104, the image clustering function or other image processing operations performed by device 10 is stopped (or reduced in speed/intensity). As additional examples, email downloading operations and/or email attachment downloading operations can be suspended and maintenance tasks associated with operating system functions may be terminated (e.g., tasks associated with compressing files, indexing files, uploading information to cloud servers, downloading and/or installing updates). Executing training algorithms (e.g., training algorithms involving processing of location data to determine if a user is at home or at work), and/or other power-intensive code-based processor operations can be selectively suspended/terminated. The examples above may collectively be characterized as the reduction of background processes in the electronic device.

Hardware adjustments that can be made during step 104 involve reducing processor clock speeds, limiting the maximum clock speed associated with clock speed bursts, and reducing the number of processor cores that are active. The examples above may collectively be characterized as the reduction of background processes in the electronic device. Additionally, hardware adjustments involve turning off or otherwise adjusting components that consume larger amounts of power (e.g., turning off a satellite navigation system receiver or reducing satellite navigation system receiver power consumption when not needed, turning off image-based sensors, lowering maximum permitted screen brightness in a display, lowering display refresh rates, lowering display resolution, etc.).

In some embodiments (such as when electronic device 10 receives wireless power from a charging mat), control circuitry 12 may be able to control the amount of power received from charger 42. For example, electronic device 10 and/or charger 42 may communicate wirelessly using in-band or out-of-band communications. Control circuitry may therefore optionally reduce the amount of power transmitted from charger 42. In this case, state of charge profile 58 may be controlled to reach a steady-state (i.e., where the incoming power is equal to the power consumed by the device and the state of charge is constant). This may further reduce sawtoothing in the state of charge profile of battery 38.

Figure 5:
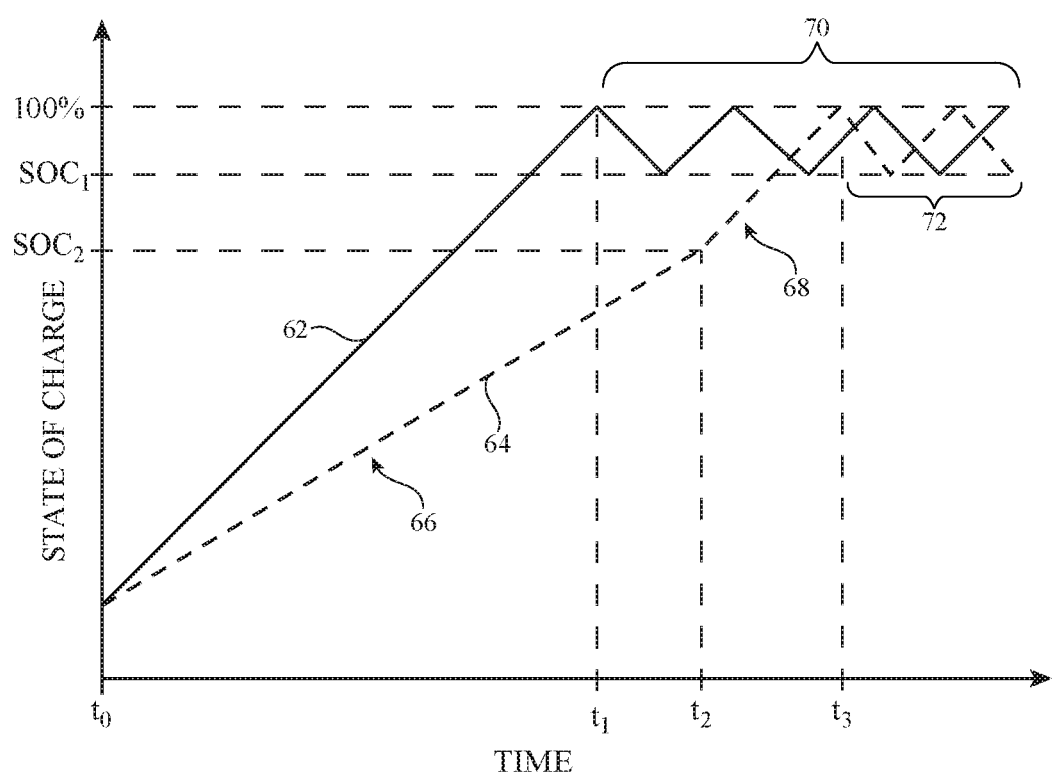
FIG. 5 is a graph of illustrative state of charge profiles showing how background processes may be performed to reduce sawtoothing in a battery in accordance with an embodiment.

FIG. 5 is a graph of illustrative state of charge profiles showing how background processes may be performed to reduce sawtoothing in battery 38. First, consider state of charge profile 62 (where no preventative actions are taken). As shown, the state of charge may increase between $t_0$ and $t_1$ until a state of charge of 100% is reached. The profile may then exhibit sawtoothing for time period 70 as shown.

To mitigate the length of time the battery undergoes sawtoothing, background processing may be increased while the battery is being charged. State of charge profile 64 has a first segment 66 (i.e., the portion of profile 64 between $t_0$ and $t_2$) during which increased levels of background processing are exhibited. By devoting more power to the increased levels of background processing, less power is distributed to battery 38. At $t_2$, the state of charge may reach a state of charge threshold $SOC_2$ (due to the voltage of the battery surpassing a safety voltage) and the temperature of the battery may be greater than a safety temperature. In these conditions, it may be desirable to reduce background processing levels. Accordingly, state of charge profile 64 has a second segment 68 (i.e., the portion of profile 64 between $t_2$ and $t_3$) during which reduced levels of background processing are exhibited. By reducing the background processing levels at $t_2$, the potential to damage the battery due to high voltage and high temperature conditions is reduced.

In state of charge profile 64, because of the increased background processing between to and $t_2$, the state of charge does not reach 100% until $t_3$. Profile 64 therefore only exhibits sawtoothing during time period 72. Sawtoothing time period 72 for profile 64 with increased background processing is shorter than sawtoothing time period 70 for profile 62 without increased background processing. To summarize, increasing background processing may reduce the length of time during which sawtoothing is required. However, to prioritize battery health, background processing levels may be reduced based on the battery conditions (i.e., at high state of charge and temperature values).

Operating with increased background processing levels only below state of charge threshold $SOC_2$ may have the first benefit of ensuring battery health. Additionally, increased background processing when state of charge is low may have a greater effect on charge duration than when state of charge is high. The battery current demand for charging is inversely proportional to the state of charge of the battery. In other words, when state of charge is low, diverting power to background processing may delay the time until sawtoothing by a greater amount of time than diverting the same amount of power to background processing when state of charge is high. Increasing background processing below $SOC_2$ will therefore be more effective at delaying sawtoothing in addition to preserving battery health. The state of charge threshold (i.e., $SOC_2$ in FIG. 5) may be any desired state of charge (i.e., 80%, between 75% and 85%, between 70% and 90%, greater than 60%, less than 100%, between 70 and 95%, etc.).

Figure 6:
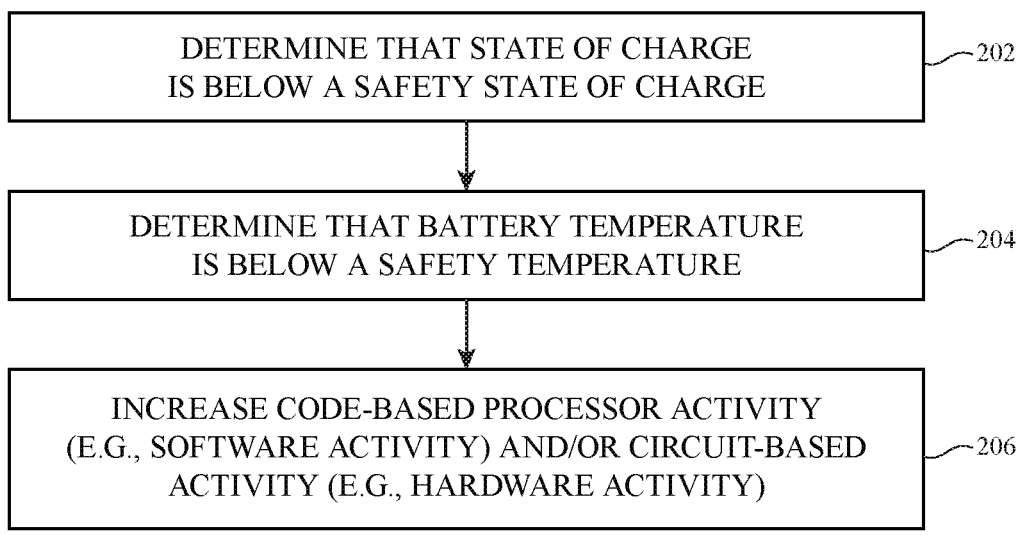
FIG. 6 is a flowchart showing illustrative method steps for reducing sawtoothing by increasing background processing below certain state of charge and temperature levels in accordance with an embodiment.

FIG. 6 is a flowchart showing illustrative method steps for reducing sawtoothing by increasing background processing below certain voltage and temperature levels. As shown, at step 202 control circuitry (i.e., control circuitry 12) may determine that the state of charge (SOC) is below a safety state of charge ($SOC_{SAFETY}$). Control circuitry 12 may receive the state of charge from battery gauge 39 and compare the state of charge to the safety state of charge. Next, at step 204, control circuitry (i.e., control circuitry 12) may determine that the battery temperature (T) is below a safety temperature ($T_{SAFETY}$). Control circuitry 12 may receive the battery temperature from battery gauge 39 and compare the temperature to the safety temperature. If the state of charge is below the safety state of charge and the battery temperature is below the safety temperature, control circuitry 12 may increase code-based processor activity and/or circuit-based activity (i.e., increase background processing) at step 206.

FIG. 6 describes determining that the state of charge of battery 38 is less than a safety state of charge (i.e., a state of charge threshold such as $SOC_2$ in FIG. 5). However, instead of comparing the state of charge to a state of charge threshold, the voltage of the battery may be compared to a voltage threshold if desired. Additionally, the order of steps shown in FIG. 6 is merely illustrative and not meant to be limiting.

Figure 7:
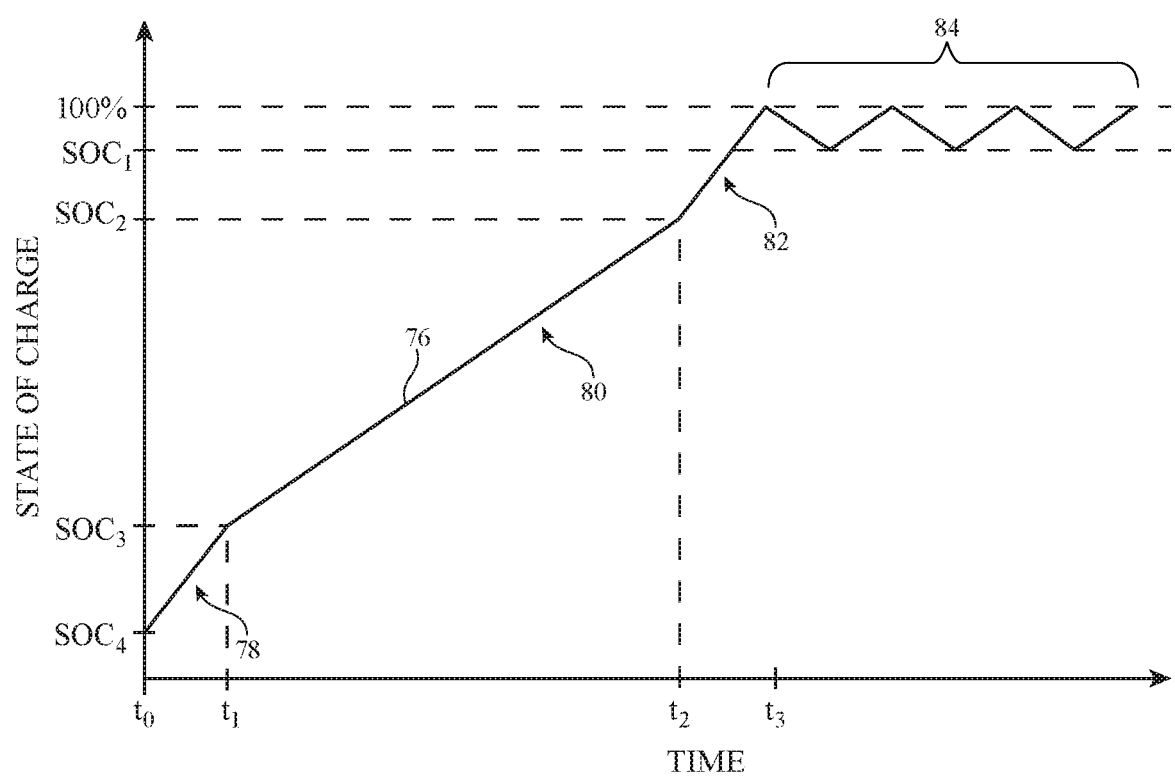
FIG. 7 is a graph of an illustrative state of charge profile showing how background processes may be reduced initially during charging in accordance with an embodiment.

FIG. 7 is a graph of an illustrative state of charge profile showing how background processes may be stopped initially due to user considerations. FIG. 7 shows profile 76 of state of charge over time. Profile 76 in FIG. 7 is similar to profile 66 of FIG. 5. In segment 80 of profile 76, background processing levels may be increased. In segment 82 of profile 76, background processing levels may be decreased (due to the state of charge and temperature exceeding recommended levels). Sawtoothing may then occur during time period 84. However, unlike in FIG. 5, in FIG. 7 background processing may be reduced in segment 78 between $t_0$ and $t_1$. Although the battery conditions do not require a reduction of background processing (i.e., even though $SOC<SOC_{SAFETY}$), background processing may still be reduced before $t_1$.

The background processing may be reduced to ensure that the battery charges at a rapid pace when it first starts charging. In other words, in order to satisfy the user of the electronic device, non-critical software and/or hardware functions can initially be deactivated and all received power may be devoted to battery charging during this time period. After a threshold is reached at $t_1$, background processing may be increased. The threshold may be either a time threshold or a state of charge threshold. For example, when a user starts charging the electronic device, background processing may be reduced for a given length of time (e.g., 15 minutes, between 10 and 20 minutes, between 10 and 30 minutes, between 10 and 60 minutes, less than 30 minutes, less than 60 minutes, greater than 5 minutes, greater than 10 minutes, greater than 20 minutes, etc.). Alternatively, when a user starts charging the electronic device, background processing may be reduced until the state of charge reaches a given level (e.g., 20%, 25%, 30%, 35%, between 15% and 30%, between 10% and 30%, between 10% and 40%, greater than 10%, less than 50%, etc.).

Figure 8:
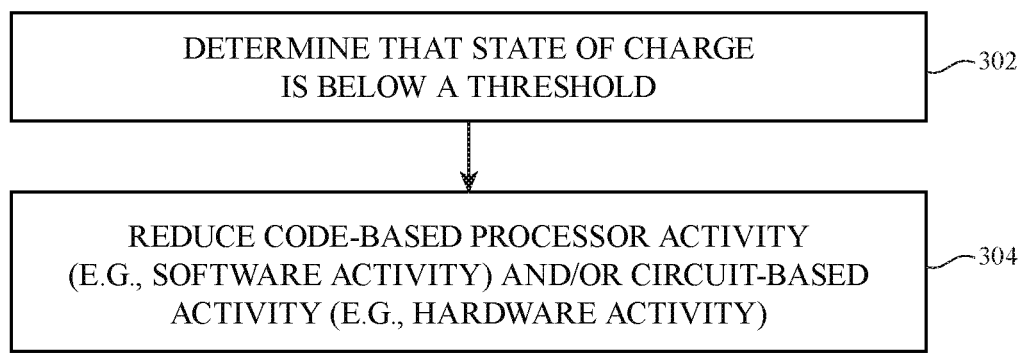
FIG. 8 is a flowchart showing illustrative method steps for reducing background processing after charging begins in accordance with an embodiment.

FIG. 8 is a flowchart showing illustrative method steps for reducing background processing immediately after charging begins. As shown, at step 302 control circuitry 12 may determine that the state of charge is below a given threshold. In response to determining that the state of charge is below the state of charge threshold, control circuitry 12 may reduce code-based processor activity and/or circuit-based activity at step 304. As previously discussed, a time threshold may also be used instead of a state of charge threshold.

Figure 9:
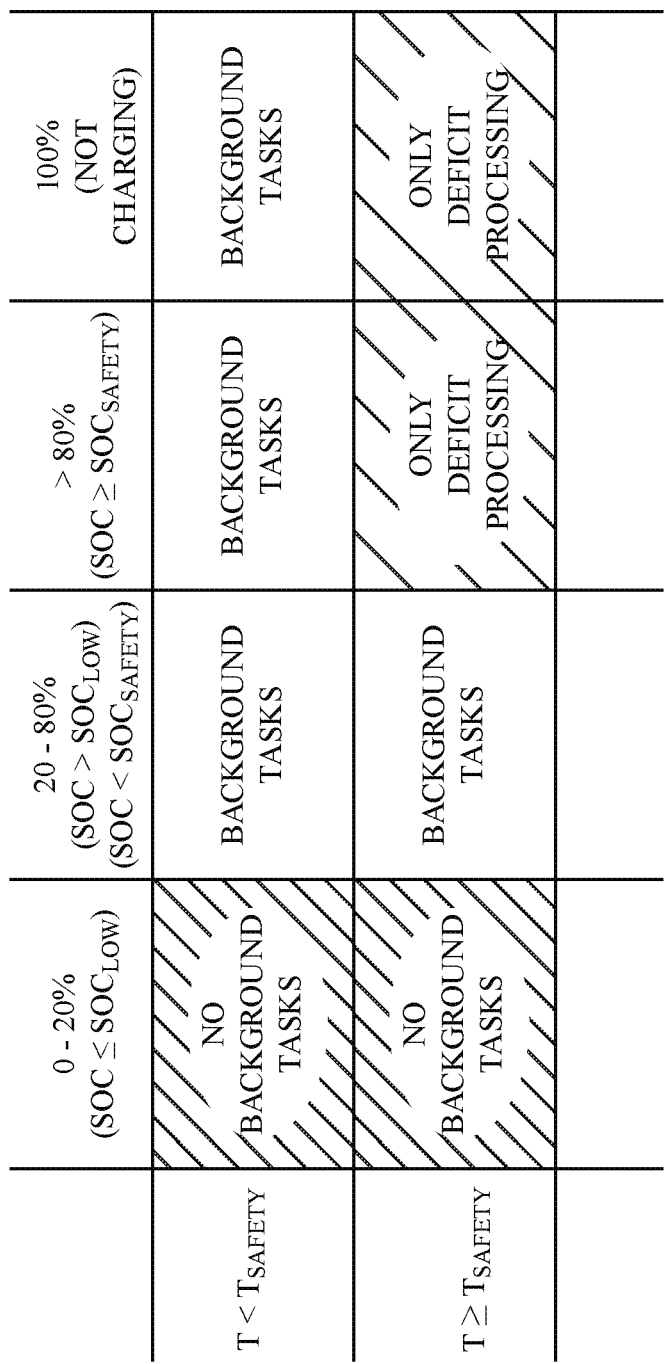
FIG. 9 shows a table of illustrative conditions for determining whether or not background processes will be performed in an electronic device in accordance with an embodiment.

FIG. 9 shows a table of illustrative conditions for determining whether or not background processes (e.g., background tasks) will be performed. Control circuitry such as control circuitry 12 may determine background processing levels for electronic device 10 based on the table of FIG. 9. As shown, when the state of charge of the battery is below a low state of charge threshold $SOC_{LOW}$ (such as $SOC_3$ in FIG. 7) no background tasks may be performed regardless of battery temperature. In the example of FIG. 9, $SOC_{LOW}$ is 20%. Similarly, when state of charge SOC is less than safety state of charge $SOC_{SAFETY}$ and greater than the threshold $SOC_{LOW}$, background tasks may be performed regardless of battery temperature. $SOC_{SAFETY}$ may be 80%, meaning this range is 20% to 80% in this example. When state of charge exceeds $SOC_{SAFTEY}$, background tasks may be performed if the battery temperature is less than a safety temperature (i.e., $T<T_{SAFETY}$). If the temperature is greater than or equal to the safety temperature (i.e., $T≥T_{SAFETY}$) while state of charge exceeds $SOC_{SAFETY}$, only deficit processing may be performed.

Any desired values may be used for the aforementioned thresholds. $SOC_{LOW}$ may be 20%, 25%, 30%, 35%, between 15% and 30%, between 10% and 30%, between 5% and 30%, between 10% and 40%, greater than 10%, less than 50%, or any other desired state of charge. $SOC_{SAFTEY}$ may be 80%, between 75% and 85%, between 70% and 90%, greater than 60%, less than 100%, between 70 and 95%, or any other desired state of charge. $T_{SAFETY}$ may be 35° C., between 34° C. and 36° C., between 33° C. and 37° C., between 30° C. and 40° C., greater than 25° C., less than 50° C., or any other desired temperature.

If desired different thresholds may be used for different background processing tasks. Higher priority tasks may have lower associated $SOC_{LOW}$ values than lower priority tasks. For example, a high priority task may have $SOC_{LOW}$ of 10% whereas a low priority task may have a $SOC_{LOW}$ of 20%. This ensures that the high priority task is started earlier than the low priority task. In general, each background process may have any desired associated low state of charge threshold $SOC_{LOW}$.

As previously mentioned, there may be a quota of desired background processing that device 10 needs to perform in a given length of time. For example, electronic device 10 may aim for a given number of hours of background processing per week (e.g., 5 hours per week, 10 hours per week, 14 hours per week, 20 hours per week, between 10 and 20 hours per week, between 5 and 30 hours per week, more than 5 hours per week, more than 10 hours per week, less than 10 hours per week, less than 5 hours per week, less than 20 hours per week, less than 30 hours per week, etc.). When $SOC≥SOC_{SAFETY}$ and $T≥T_{SAFETY}$, background processing may only occur when electronic device 10 is behind on the quota of background processing. Take an example where electronic device 10 has a quota of 10 hours of background processing per week. After a given week, electronic device 10 may have only completed 7 hours of background processing. Electronic device 10 therefore has a deficit of 3 hours of background processing. In this example, background processing may occur even when $SOC≥SOC_{SAFETY}$ and $T≥T_{SAFETY}$.

Background processing may also be performed in some cases when the state of charge is 100% and the electronic device is not being charged. When the state of charge is 100% and $T<T_{SAFETY}$, background tasks may be performed. When the state of charge is 100% and $T≥T_{SAFETY}$, only deficit processing may be performed. This column of the table (e.g., labeled '100% (not charging)' may refer to situations when the battery is in the fully charged zone previously described. Additionally, 'not charging' may refer to the situation where the charger circuit of the electronic device is disconnected from the battery to stop charging the battery (even though power is still being received from an external power source). This type of situation may occur during sawtoothing (see, for example, profile 56 or 58 of FIG. 3).

If desired, numerous factors may be considered when determining whether or not to perform background tasks once the state of charge reaches the fully charged zone. In one illustrative example, the battery may enter a sawtooth period once the state of charge reaches the fully charged zone (e.g., $SOC_{FULL}$ to 100% in FIG. 2). Once the sawtooth period begins, the state of charge may remain in the battery health maintenance zone (e.g., $SOC_1$ to 100% in FIG. 2) until the electronic device is disconnected from the external power source (e.g., unplugged from a wired charger or removed from a wireless charging mat). When the state of charge reaches the fully charged zone (e.g., when the state of charge is greater than $SOC_{FULL}$), the battery may be disconnected from the external power source by the charger circuit and background processes may be performed using power from the external power source. In some situations, the amount of power received from the external power source will approximately equal the power required to perform the background processes. In these situations, the state of charge may remain relatively steady in the fully charged zone. If desired, power from the external power source may be throttled to help achieve this steady state (e.g., between received power and consumed power) in the fully charged zone.

Although steps (such as throttling the power from the external power source) may be taken to balance the consumed power with the received power, the consumed power may sometimes exceed the received power and the state of charge of the battery may drop out of the fully charged zone (e.g., the state of charge may fall below a state of charge threshold $SOC_{FULL}$ that defines the low end of the fully charged range). When the state of charge falls below the fully charged zone, one or more non-critical software and/or hardware functions (such as background processes) may be stopped to reduce the rate at which the state of charge decreases (as shown in connection with FIG. 3). The state of charge may then proceed through a sawtooth cycle by dropping to a state of charge threshold (e.g., $SOC_1$ in FIG. 2 or FIG. 3) before the charger circuit of the electronic device is reconnected to the battery. The state of charge will then increase. Once the state of charge reaches the fully charged zone again, background processes may increase (resume). This pattern may continue, with background processing being performed while the battery is in the fully charged zone, stopped if the state of charge drops below the fully charged zone, and performed once the state of charge is back in the fully charged zone after a sawtooth cycle.

The aforementioned example assumes that the temperature is sufficiently low for background processing (e.g., $T<T_{SAFETY}$). If the temperature is high (e.g., $T \geq T_{SAFETY}$), background processing may only be performed when there is a background processing deficit.

If desired, hardware adjustments can be made while the state of charge of the battery is in the battery health maintenance zone. For example, processor clock speeds may be reduced while the state of charge of the battery is in the battery health maintenance zone.

Other conditions may be taken into account by control circuitry 12 in determining background processing levels. Maintaining temperature levels in battery 38 and electronic device 10 may be important both for battery health and the user experience. For example, battery 38 exceeding certain temperatures may damage the battery. Additionally, if the temperature of electronic device 10 exceeds certain temperatures, the device may be too hot for the user to touch. Therefore, care may be taken to control temperature levels in electronic device 10.

Device 10 may be susceptible to high temperatures while being charged by a wireless charger. To conduct wireless charging device 10 may be placed on a power transmitting device such as a charging mat that transmits power to device 10 using an inductive wireless power arrangement. During charging, the charging mat or other power transmitting device (and accordingly, electronic device 10 and battery 38) may become very hot. To cool down the charging mat and the electronic device, power transmission from the charging mat may be stopped. In this arrangement, sometimes referred to as "cloaking," charging of device 10 stops even though the device is on the charging mat (and could be receiving power). Once the temperature drops below a certain level, charging may resume. In order to ensure no further exacerbation of temperature levels, background processes may be reduced or stopped during cloaking.

In some cases, a user's historical data may be used to help determine background processing levels. In some of the aforementioned embodiments, examples were described where background processing levels were increased, therefore slowing down battery charging rates. In the absence of other information, the control circuitry of device 10 may assume that the user wants device 10 to charge at a rapid rate. Therefore, although background processing is performed, the background processing may be limited to ensure that battery 38 is still charging at a reasonable rate. However, in some embodiments control circuitry 12 may recognize a long charge event. For example, a long charge event may occur if the user charges the device overnight. If a long charge event is recognized, the charging pattern may be modified accordingly. For example, control circuitry 12 may significantly reduce (or even pause) battery charging at low levels and still have time to fully charge the device before the long charge event concludes.

Figure 10:
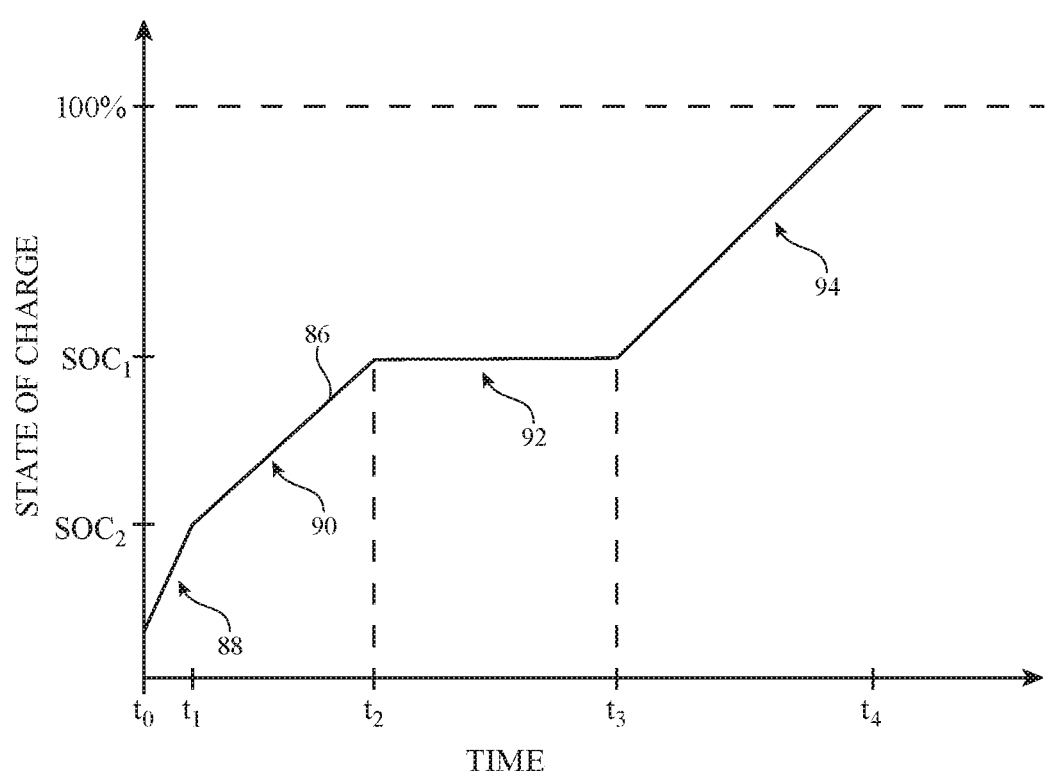
FIG. 10 is a graph of an illustrative state of charge profile showing how background processes may be controlled based on recognizing a long charge event in accordance with an embodiment.

FIG. 10 is a graph of an illustrative state of charge profile showing how background processes may be controlled based on recognizing a long charge event. State of charge profile 86 may begin at $t_0$. At $t_0$, control circuitry 12 may determine that a long charge event is occurring. However, background processes may still be reduced initially to allow a rapid charge of battery 38 in segment 88. Once the state of charge exceeds a state of charge threshold $SOC_2$ (or a time threshold is exceeded), background processing may increase in segment 90 between $t_1$ and $t_2$. Background processing may occur in segment 90 but still may not be maximized. This is to ensure that charging proceeds to an acceptable level (i.e., in case a long charge event is misidentified). The thresholds defining segments 88 and 90 may be state of charge thresholds or time thresholds. At $t_2$, a state of charge threshold such as $SOC_1$ may be reached. At this point, control circuitry may increase background processing even more for segment 92 of profile 86. Because charging is occurring during a long charge event, the state of charge may remain relatively constant during segment 92 (due to all received power being devoted to non-battery-charging activities such as background processes). At $t_3$, another threshold is reached and background processing may be reduced to allow charging of battery 38. The threshold at $t_3$ may be defined by a time buffer before the long charge event is expected to end. For example, battery charging may resume such that the expected full-charge time is 90 minutes before the long charge event is expected to end. If historical data indicates that the user is typically awake at 8:00 A.M., the control circuitry may ensure that the battery is fully charged (i.e., 100% state of charge) by 6:30 A.M.

Figure 11:
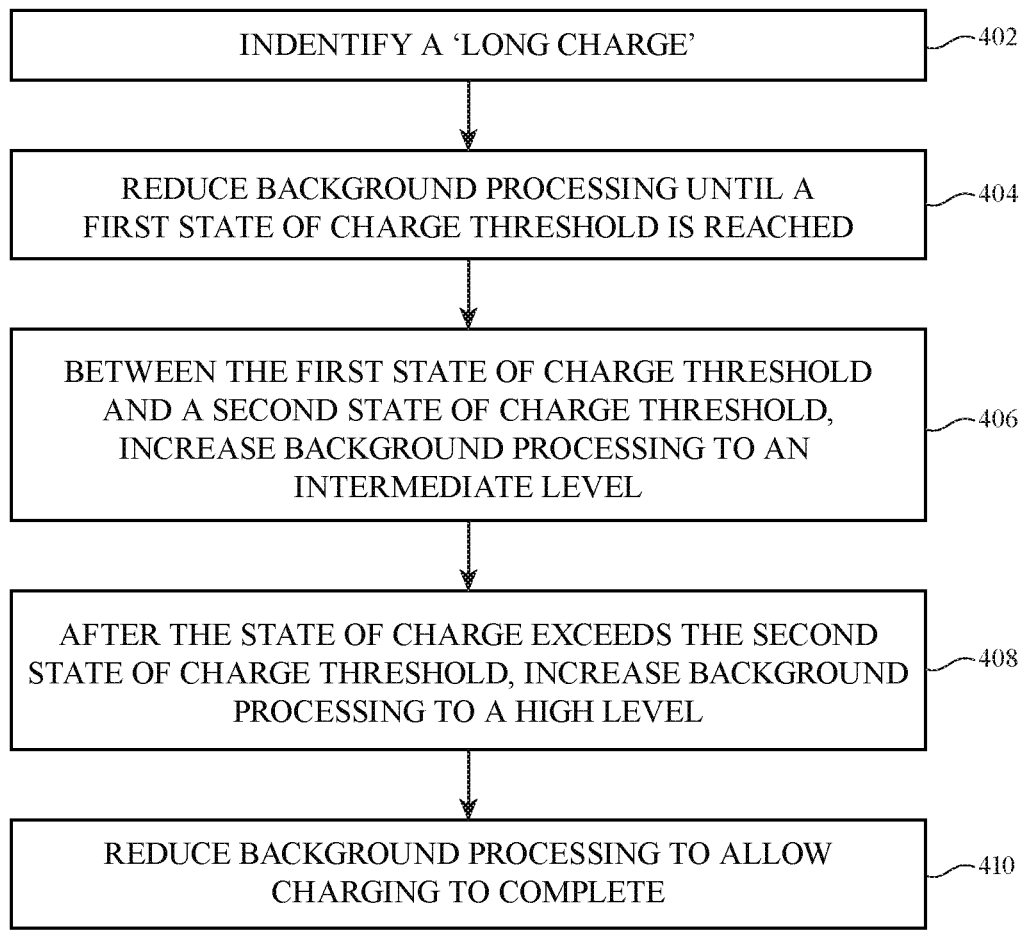
FIG. 11 is a flowchart showing illustrative method steps for adjusting background processing in response to recognizing a long charge event in accordance with an embodiment.

FIG. 11 is a flowchart showing illustrative method steps for adjusting background processing in response to recognizing a long charge event. At step 402, control circuitry such as control circuitry 12 may identify a long charge event. Next, at step 404, background processing may be reduced until a first state of charge threshold (e.g., $SOC_2$ in FIG. 10) is reached. Between the first state of charge threshold (e.g., $SOC_2$) and a second state of charge threshold (e.g., $SOC_1$ in FIG. 10), background processing may be increased to an intermediate level at step 406. Next, after the state of charge exceeds the second state of charge threshold (e.g., $SOC_1$), the background processing may be increased again to a high level. Finally, at step 410 background processing may be reduced to allow charging to complete before the long charge concludes.

Figure 12:
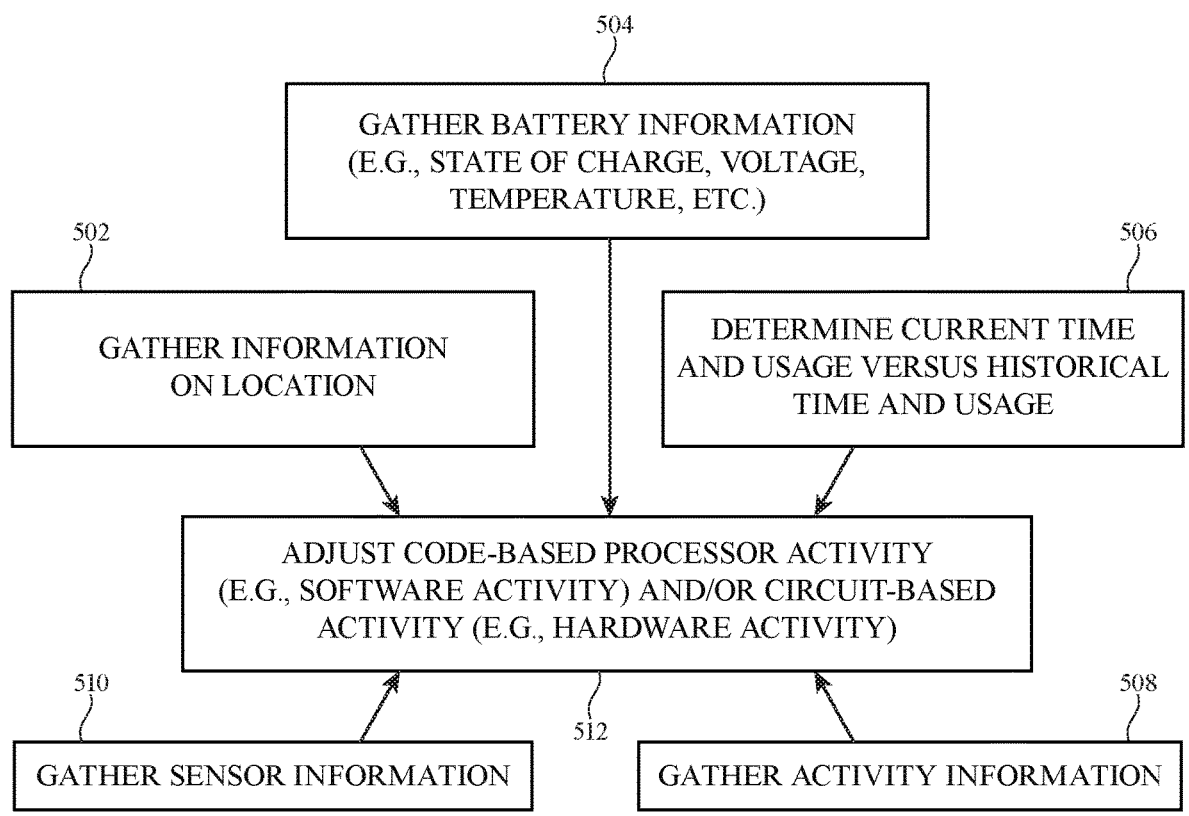
FIG. 12 is a flowchart of illustrative operations of a system with an electronic device that includes a battery in accordance with an embodiment.

FIG. 12 is a flowchart of illustrative operations of system 8. In particular, the flow chart of FIG. 12 shows illustrative information that may be gathered by device 10 during operation in order to determine how to adjust power allocation between battery and non-battery resources. During the operations of FIG. 12, device 10 may gather information and use this information in controlling the supply of power for battery charging of battery 38 and the supply of power to run control circuitry 12 (and other non-battery circuitry in device 10).

During steps 502, 504, 506, 508, and 510, device 10 (e.g., control circuitry 12) may gather information on which to base a decision on power allocation. In some embodiments, during step 512, device 10 (e.g., control circuitry 12) makes corresponding adjustments to the operation of device 10, so that battery 38 and the remaining components in device 10 can receive appropriate respective portions of the available power. As an example, control circuitry 12 may reduce or increase code-based processor activity and/or circuit-based activity (by, for example, running or stopping background processes).

If desired, location and motion information can be gathered from a satellite navigation system receiver in circuitry 20 during step 502 (e.g., by gathering velocity information from the satellite navigation system receiver and/or by comparing satellite navigation system receiver location measurements over a known period of time). By analyzing the speed of the user and other attributes of a user's motion (e.g., average and peak accelerometer values, accelerometer output trends, etc.), device 10 can determine whether device 10 is stationary, whether device 10 is in motion in a vehicle such as an automobile, whether device 10 is in motion in a user's pocket or hand, whether a user of device 10 is walking or jogging, and/or other attributes of the usage of device 10 related to device motion and/or orientation. This information may be used at step 512 in determining whether or not a long charge or an opportunistic charge is occurring and how to adjust power allocation between battery and non-battery resources.

Information from power system 28 may be gathered during step 504. During step 504, device 10 may, for example, gather information on whether charging system 42 is being used to supply power to device 10, whether power is being provided wirelessly or through a wired connection, etc. For example, device 10 can determine whether power is being supplied from a wireless charging device. Information may be gathered on the amount of power being received by power system 28 from external equipment such as system 42. Additionally, information may be gathered on the charge state of battery 38, the temperature of the battery, and/or the voltage of the battery. This information may be used at step 512 in determining whether or not a long charge or an opportunistic charge is occurring and how to adjust power allocation between battery and non-battery resources.

During step 506, device 10 may determine the current time of day (e.g., using clock 16) and may update historical information on the usage of device 10. For example, information on when device 10 is being used by a user and which components are being used and other status information may be maintained in a database in device 10 and/or on a remote server. Whenever device 10 is used, additional usage information may be stored in the database. In this way, device 10 may be provided with a user profile of popular and unpopular usage times. The usage history information maintained by device 10 may allow device 10 to determine how to allocate power between non-battery-charging operations and battery charging operations. For example, usage history information may indicate when a fully charged battery is desirable. As another example, battery charge state preservation may be prioritized during the middle of the day, when a user is generally away from charging locations and is most likely in need of extended battery power. Late at night, when a user is likely sleeping, battery charging is expected to complete over a period of many hours (e.g., overnight), so device 10 need not prioritize battery charging (e.g., background processing and other discretionary activities in device 10 can be allowed to take place as expected in an environment without power constraints). The information from step 506 may be used at step 512 in determining whether or not a long charge or an opportunistic charge is occurring and how to adjust power allocation between battery and non-battery resources.

Information on a user's location and daily activities can also be gathered from calendar entries and/or other software settings during step 508. This information can be used to help prioritize battery charging before time periods in which charging is not convenient or possible. The information from step 508 may be used at step 512 in determining whether or not a long charge or an opportunistic charge is occurring and how to adjust power allocation between battery and non-battery resources.

During step 510, device 10 may gather sensor information from sensors 26 in device 10. As an example, device 10 can gather information from a temperature sensor and/or an ambient light sensor. Temperature and/or ambient light information may be used to determine whether device 10 is in an environment with elevated temperatures (e.g., a bright and hot outdoors environment, etc.). Information on the operating environment of device 10 may also be gathered from on-line weather sources, from location information, etc. In operating environments with an elevated temperature and/or an elevated light exposure, there is an elevated sensitivity to operating device 10 with high amounts of software and/or hardware activity. As a result, when it is determined that device 10 is operating in a thermally challenging environment, device 10 can proactively reduce software and/or hardware activity at step 512 to maintain device 10 below its thermal limits and thereby maintain sufficient thermal headroom for dynamically demanded activities and battery charging. As another example, device 10 (e.g., control circuitry 12) may gather motion sensor information from an inertial measurement unit (accelerometer, compass, and/or magnetometer) during the operations of step 510. Motion sensor information may be used (optionally with location information from step 502) to determine information regarding motion of device 10. This information may be used at step 512 in determining whether or not a long charge or an opportunistic charge is occurring and how to adjust power allocation between battery and non-battery resources.

In numerous embodiments herein, state of charge measurements and state of charge thresholds are described as being used to determine battery charging and background processing behavior. However, it should be understood that the state of charge is derived from battery voltage levels. Accordingly, for each state of charge measurement or state of charge threshold mentioned herein the voltage of the battery (or a corresponding voltage threshold) may be used if desired.

The foregoing is merely illustrative and various modifications can be made to the described embodiments. The foregoing embodiments may be implemented individually or in any combination.

What is claimed is:

1. An electronic device configured to receive power from an external power source, comprising:
   a battery configured to be charged;
   a battery gauge coupled to the battery that measures a state of charge of the battery;
   a charger circuit configured to receive power from the external power source and to charge the battery using power received from the external power source; and
   control circuitry coupled to the battery and configured to:
   run a plurality of processes;
   receive a state of charge measurement measured using the battery gauge;
   upon receiving the state of charge measurement measured using the battery gauge, disconnect the battery from the charger circuit while the charger circuit receives power from the external power source; and
   stop at least one process of the plurality of processes while the battery is disconnected from the charger circuit and the charger circuit is receiving power from the external power source.

2. The electronic device of claim 1, wherein the control circuitry is configured to:
   compare the state of charge measurement to a state of charge threshold, wherein stopping the at least one process of the plurality of processes while the battery is disconnected from the charger circuit and the charger circuit is receiving power from the external power source comprises stopping the at least one process of the plurality of processes in response to determining that the state of charge measurement is less than the state of charge threshold.

3. The electronic device of claim 2, wherein disconnecting the battery from the charger circuit while the charger circuit receives power from the external power source comprises disconnecting the battery from the charger circuit in response to determining that the state of charge measurement exceeds the state of charge threshold.

4. The electronic device of claim 1, wherein the control circuitry is configured to:
   before receiving the state of charge measurement, receive an additional state of charge measurement measured using the battery gauge;
   determine if the additional state of charge measurement is below a state of charge threshold;
   determine if the battery is being charged; and
   stop at least one process of the plurality of processes in response to determining that the additional state of charge measurement is less than the state of charge threshold and that the battery is being charged.

5. The electronic device of claim 4, wherein the control circuitry is configured to:
   forgo stopping the at least one process in response to determining that the additional state of charge measurement is greater than the state of charge threshold and that the battery is being charged.

6. The electronic device of claim 5, wherein the state of charge threshold is a first state of charge threshold and wherein the control circuitry is configured to:
   determine if the additional state of charge measurement exceeds a second state of charge threshold that is greater than the first state of charge threshold; and
   stop at least one process in response to determining that the additional state of charge measurement is greater than the second state of charge threshold and that the battery is being charged.

7. The electronic device of claim 4, wherein the state of charge threshold is a first state of charge threshold and wherein the control circuitry is configured to:
   determine if the state of charge measurement exceeds a second state of charge threshold that is greater than the first state of charge threshold; and
   forgo stopping the at least one process in response to determining that the state of charge measurement is greater than the first state of charge threshold and less than the second state of charge threshold and that the battery is being charged.

8. The electronic device of claim 7, wherein the electronic device further comprises a temperature sensor configured to measure a temperature associated with the battery and wherein the control circuitry is configured to:
   compare the temperature to a temperature threshold; and
   stop at least one process in response to determining that the state of charge is greater than the second state of charge threshold, that the temperature is greater than the temperature threshold, and that the battery is being charged.

9. The electronic device of claim 7, wherein the first state of charge threshold is between 10% and 40% and the second state of charge threshold is between 70% and 90%.

10. The electronic device of claim 1, wherein the at least one process comprises indexing files.

11. The electronic device of claim 1, wherein the at least one process comprise at least one background process.

12. An electronic device comprising:
   a battery configured to be charged;
   a battery gauge coupled to the battery that measures a state of charge of the battery; and
   control circuitry coupled to the battery and configured to:
   receive a state of charge measurement measured using the battery gauge;
   determine if the state of charge measurement is below a first state of charge threshold;
   determine if the state of charge measurement is below a second state of charge threshold;
   determine if the battery is being charged;
   run at least one process in response to determining that the state of charge measurement is greater than the first state of charge threshold and less than the second state of charge threshold and that the battery is being charged; and
   stop the at least one process in response to determining that the state of charge measurement is greater than the second state of charge threshold and that the battery is being charged.

13. The electronic device of claim 12, wherein the first state of charge threshold is between 10% and 40% and the second state of charge threshold is between 70% and 90%.

14. The electronic device of claim 13, wherein the control circuitry is configured to:
reduce a processor clock speed in response to determining that the state of charge measurement is greater than a third state of charge threshold, wherein the third state of charge threshold is greater than the second state of charge threshold.

15. An electronic device comprising:
a battery configured to be charged;
a battery gauge coupled to the battery that measures a state of charge of the battery;
a temperature sensor that measures a temperature associated with the battery; and
control circuitry configured to:
run a plurality of processes;
receive a state of charge measurement measured using the battery gauge;
receive a temperature measurement measured using the temperature sensor;
determine if the state of charge measurement exceeds a state of charge threshold;
determine if the temperature measurement exceeds a temperature threshold;
determine if the battery is being charged; and
stop at least one process of the plurality of processes in response to determining that the state of charge measurement is greater than the state of charge threshold, that the temperature measurement is greater than the temperature threshold, and that the battery is being charged.

16. The electronic device of claim 15, wherein the control circuitry is configured to:
forgo stopping the at least one process in response to determining that the state of charge measurement is greater than the state of charge threshold, that the temperature measurement is less than the temperature threshold, and that the battery is being charged.

17. The electronic device of claim 15, wherein the control circuitry is configured to:
forgo stopping the at least one process in response to determining that the state of charge measurement is less than the state of charge threshold, that the temperature measurement is greater than the temperature threshold, and that the battery is being charged.

18. The electronic device of claim 15, wherein the state of charge threshold is a first state of charge threshold and wherein the control circuitry is configured to:
compare the state of charge measurement to a second state of charge threshold; and
forgo stopping at least one process in response to determining that the state of charge measurement is less than the first state of charge threshold and greater than the second state of charge threshold.

19. The electronic device of claim 15, wherein the at least one process comprises indexing files.

20. The electronic device of claim 15, wherein the state of charge threshold is between 70% and 90% and wherein the temperature threshold is between 33° C. and 37° C.

* * * * *